(12) United States Patent
Cheung et al.

(10) Patent No.: US 9,797,601 B2
(45) Date of Patent: Oct. 24, 2017

(54) BLUFF BODY FUEL MIXER

(71) Applicant: United Technologies Corporation, Hartford, CT (US)

(72) Inventors: Albert K. Cheung, East Hampton, CT (US); James B. Hoke, Tolland, CT (US); Randal G. McKinney, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 214 days.

(21) Appl. No.: 14/601,389

(22) Filed: Jan. 21, 2015

(65) Prior Publication Data

US 2016/0209039 A1 Jul. 21, 2016

(51) Int. Cl.
| | |
|---|---|
| F23R 3/28 | (2006.01) |
| B01F 15/02 | (2006.01) |
| B01F 3/04 | (2006.01) |
| F02C 7/22 | (2006.01) |
| F02M 61/16 | (2006.01) |
| F23R 3/34 | (2006.01) |
| F23D 11/38 | (2006.01) |

(52) U.S. Cl.
CPC ............... *F23R 3/286* (2013.01); *B01F 3/04* (2013.01); *B01F 15/0274* (2013.01); *F02C 7/22* (2013.01); *F02M 61/162* (2013.01); *F23D 11/383* (2013.01); *F23R 3/34* (2013.01)

(58) Field of Classification Search
CPC .. F23R 3/286; F23R 3/34; F23R 3/346; F23D 11/383; F23D 14/02; F23D 14/62; F23D 14/64; F02C 7/22
See application file for complete search history.

(56) References Cited

U.S. PATENT DOCUMENTS

| | | | | |
|---|---|---|---|---|
| 3,792,582 A | * | 2/1974 | Markowski | ............... F23R 3/34 |
| | | | | 431/284 |
| 5,471,840 A | | 12/1995 | Lovett | |
| 5,575,153 A | | 11/1996 | Ito et al. | |
| 5,675,971 A | * | 10/1997 | Angel | ..................... F23R 3/286 |
| | | | | 239/405 |

(Continued)

FOREIGN PATENT DOCUMENTS

| | | |
|---|---|---|
| CH | 593457 | 11/1977 |
| JP | 2006010193 | 1/2006 |

OTHER PUBLICATIONS

Extended European Search Report dated Sep. 7, 2016 in European Application No. 15194552.4.

*Primary Examiner* — Arun Goyal
(74) *Attorney, Agent, or Firm* — Snell & Wilmer, L.L.P.

(57) ABSTRACT

A combustor is provided. The combustor may include an axial fuel injection system, and a radial fuel injection system aft of the axial fuel injection system. The axial fuel injection system includes a mixer having a bluff body at an exit port of the mixer, and a fuel injector disposed within the mixer. A fuel and air mixer is also provided and comprises an outer housing with an exit port and a bluff body. The bluff body extends across the exit port of the outer housing. A fuel injection system is also provided. The systems comprise a mixer having a bluff body at an exit port of the mixer and a fuel injector disposed within the mixer.

16 Claims, 7 Drawing Sheets

(56) References Cited

U.S. PATENT DOCUMENTS

| | | | | |
|---|---|---|---|---|
| 8,656,721 | B2* | 2/2014 | Matsumoto | F23R 3/34 |
| | | | | 60/733 |
| 9,222,673 | B2* | 12/2015 | Boardman | F23D 11/103 |
| 9,482,434 | B2* | 11/2016 | Davis, Jr. | F23R 3/346 |
| 9,534,790 | B2* | 1/2017 | Cai | F23R 3/346 |
| 9,551,490 | B2* | 1/2017 | DiCintio | F23R 3/14 |
| 2015/0219338 | A1* | 8/2015 | Dai | F23R 3/346 |
| | | | | 60/746 |
| 2016/0245525 | A1* | 8/2016 | Snyder, III | F23R 3/06 |

* cited by examiner

BLUFF BODY FUEL MIXER

GOVERNMENT LICENSE RIGHTS

This disclosure was made with government support under contract No. NNC13TA45T awarded by National Aeronautics and Space Administration (NASA). The government has certain rights in the disclosure.

FIELD OF INVENTION

The present disclosure relates to combustion systems for gas turbine engines, and, more specifically, to a bluff body fuel mixer for a combustor.

BACKGROUND

Gas turbine engines may comprise a compressor for pressurizing an air supply, a combustor for burning a fuel, and a turbine for converting the energy from combustion into mechanical energy. The combustor may have an inner liner and an outer liner that define a combustion chamber. A fuel injector would typically introduce fuel into a forward section of the combustor. As the fuel burns, nitrogen oxide (NOx) emissions may be produced. NOx emissions may be subject to administrative regulation. An engine with high NOx emissions may not meet such regulatory standards.

SUMMARY

A combustor comprises an axial fuel injection system, and a radial fuel injection system aft of the axial fuel injection system. The axial fuel injection system includes a mixer having a bluff body at an exit port of the mixer, and a fuel injector disposed within the mixer.

In various embodiments, a counter swirler is disposed around the fuel injector. The bluff body may include a v-shaped gutter. The mixer may comprise a cylindrical outer housing. A liner may have the radial fuel injection system extending at least partially though the liner. A mounting structure may be coupled to the liner with an outer housing of the mixer disposed at least partially within the mounting structure. The mixer may comprise tabs retained in a slot defined by the mounting structure. The mixer may comprise a flared surface matching a contour of the bluff body. The bluff body may include a circular, multi-radial, squared, or irregularly shaped gutter.

A fuel and air mixer comprises an outer housing with an exit port and a bluff body. The bluff body extends across the exit port of the outer housing. A turbulator is disposed in the outer housing. The bluff body comprises a v-shaped gutter. The outer housing has a cylindrical geometry. Tabs extend from the outer housing and are configured to couple the outer housing to a combustor. The mixer may include a flared surface matching a contour of the bluff body. The bluff body comprises a circular, multi-radial, squared, or irregularly shaped gutter.

A fuel injection system may comprise a mixer having a bluff body at an exit port of the mixer and a fuel injector disposed within the mixer.

In various embodiments, a turbulator is disposed in the mixer. The bluff body may comprise a gutter. The mixer may include a flared surface matching a contour of the bluff body.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
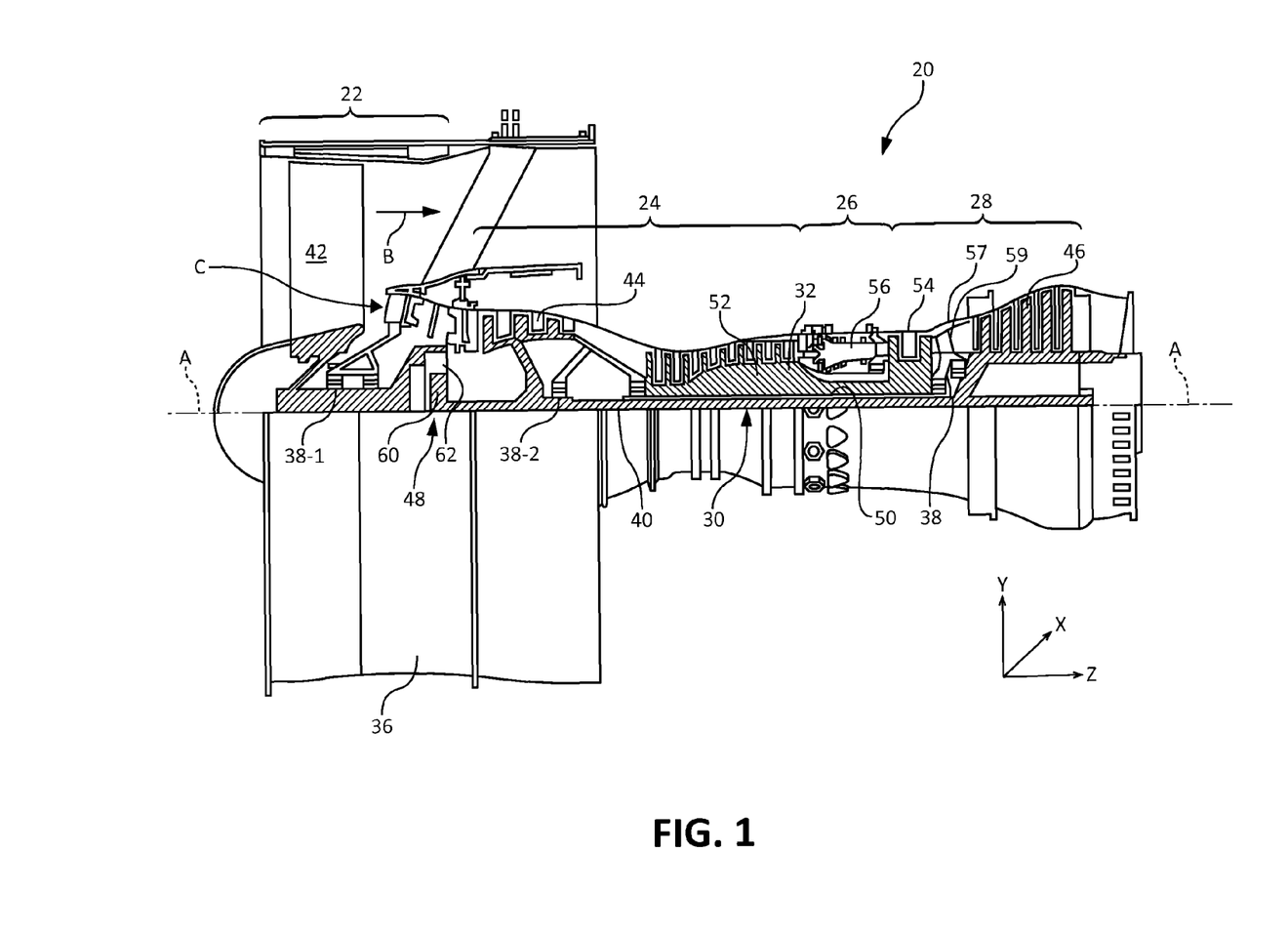
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Airfoils 59 may be formed integrally into a full-ring, mid-turbine-frame stator and retained by a retention pin. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
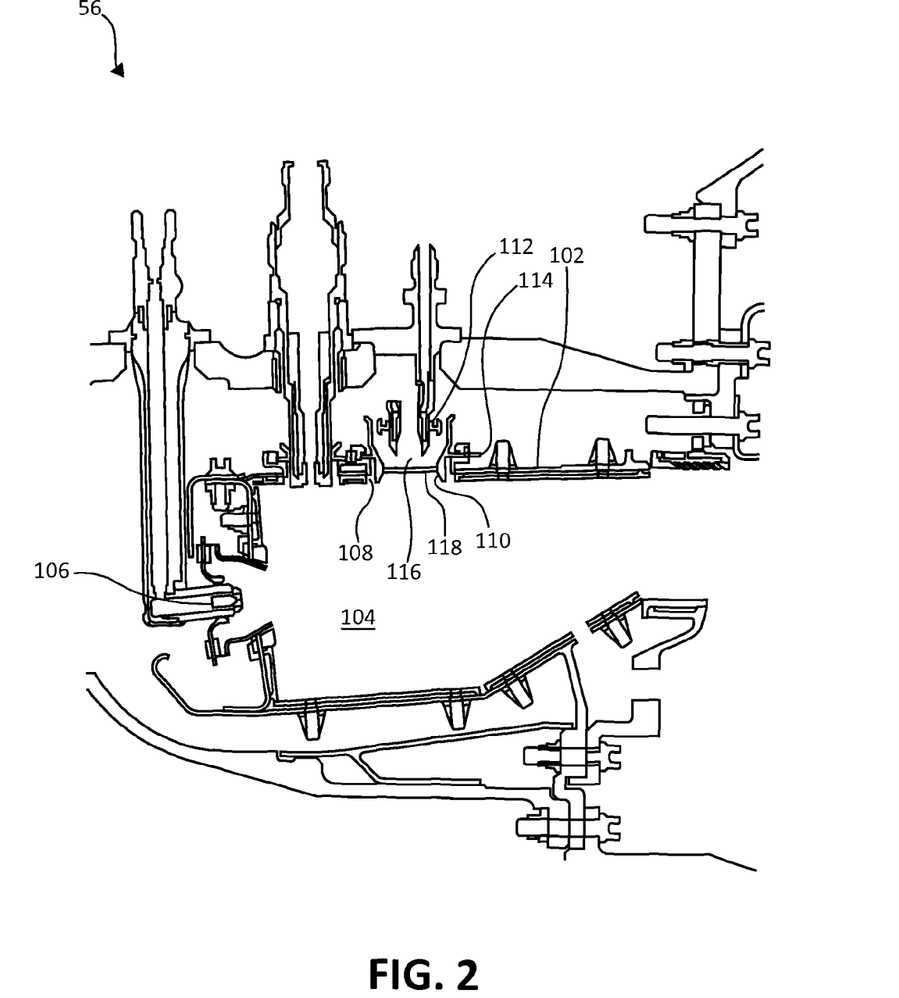
FIG. 2 illustrates a combustor of a gas turbine engine including a radial fuel injector with a bluff body mixer, in accordance with various embodiments.

With reference to FIG. 2, a combustor 56 having an axial fuel injection system 106 at a forward location of the combustor and a radial fuel injection system 112 aft of axial fuel injection system 106 according to various embodiments. Radial fuel injection system 112 delivers fuel into combustion chamber 104 in a radial direction. Radial fuel injection system 112 rests in cavity 116 defined by bluff body 118 and mixer 110. Mixer 110 mixes the fuel delivered by radial fuel injection system 112 with air and provides a stable burn pattern. Mixer 110 comprises a bluff body 118 extending from inner walls of mixer 110, as described in further detail below. Mixer 110 may rest in opening 108 defined by combustor liner 102. Mixer 110 may be secured to combustor 56 by tabs 114.

Figure 3:
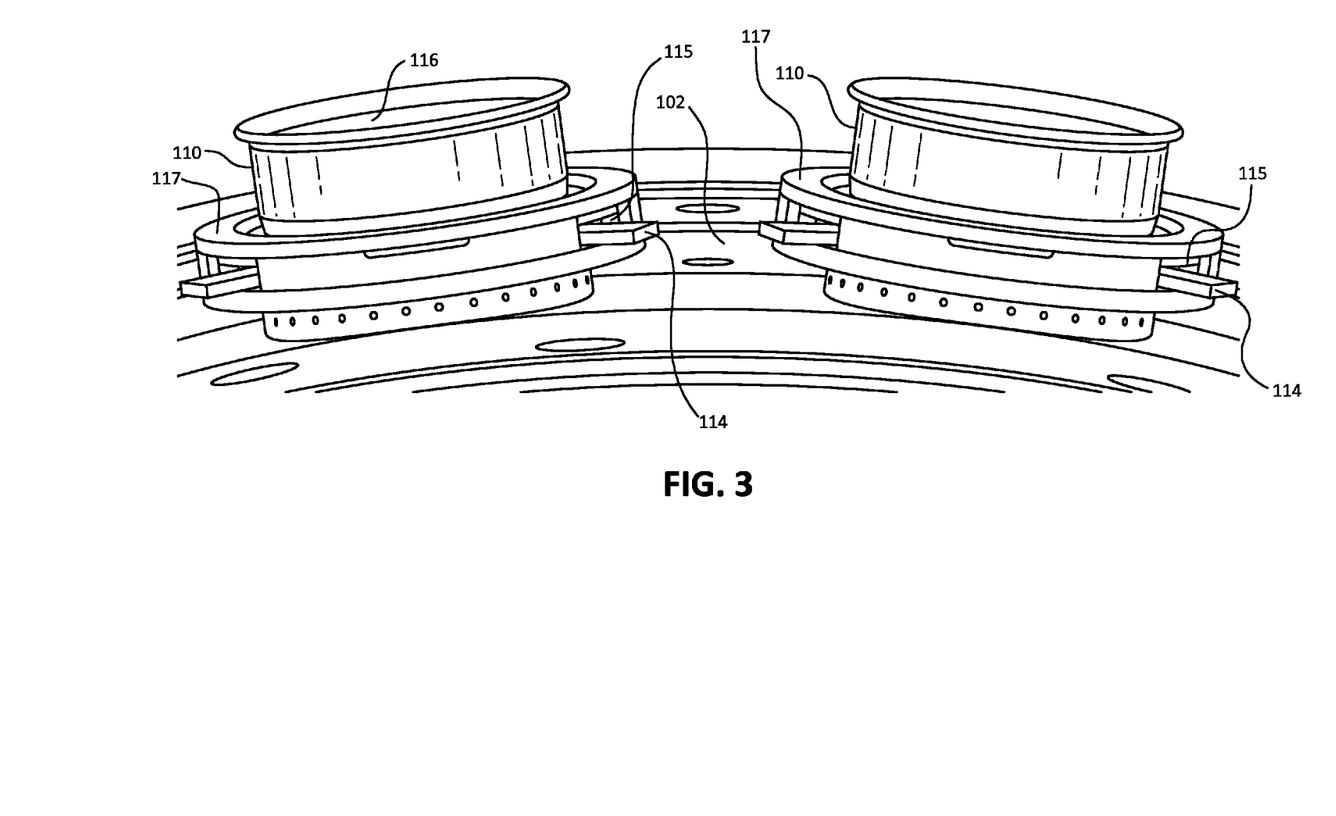
FIG. 3 illustrates a surface of a combustor with bluff body mixers inserted into the liner, in accordance with various embodiments.

With reference to FIG. 3, tabs 114 may be coupled to combustor liner 102 by sliding into slots 115 of mounting structure 117. In that regard, mixer 110 is loosely coupled to combustor liner 102 and has freedom of movement to allow for changes in the ambient environment due to drastic temperature changes found in and around combustor 56. Mixer 110 may have a cylindrical outer housing disposed partially within mounting structure 117. Mounting structure 117 may be a cylindrical housing with slots 115 to receive tabs 114. Mixer 110 extends radially outward from mounting structure 117 and defines cavity 116 where a fuel nozzle may rest in the assembled engine.

Figure 4:
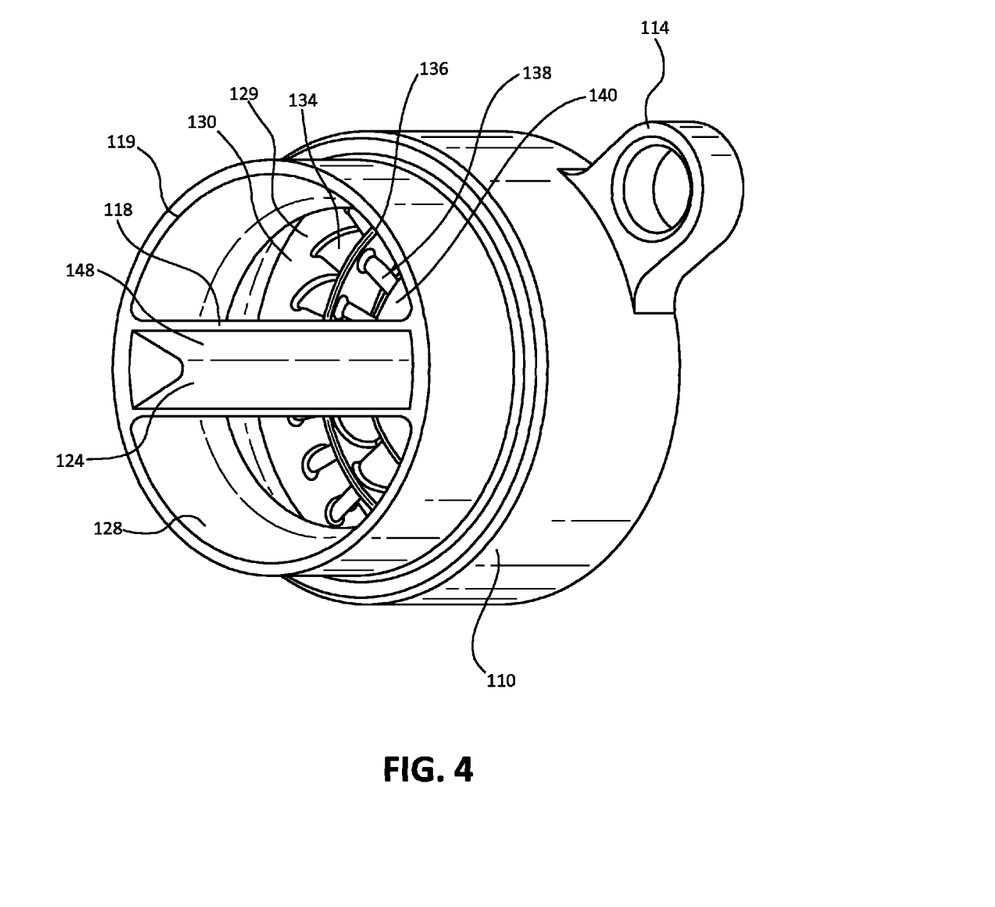
FIG. 4 illustrates a cross sectional view of a bluff body mixer, in accordance with various embodiments.
Figure 5:
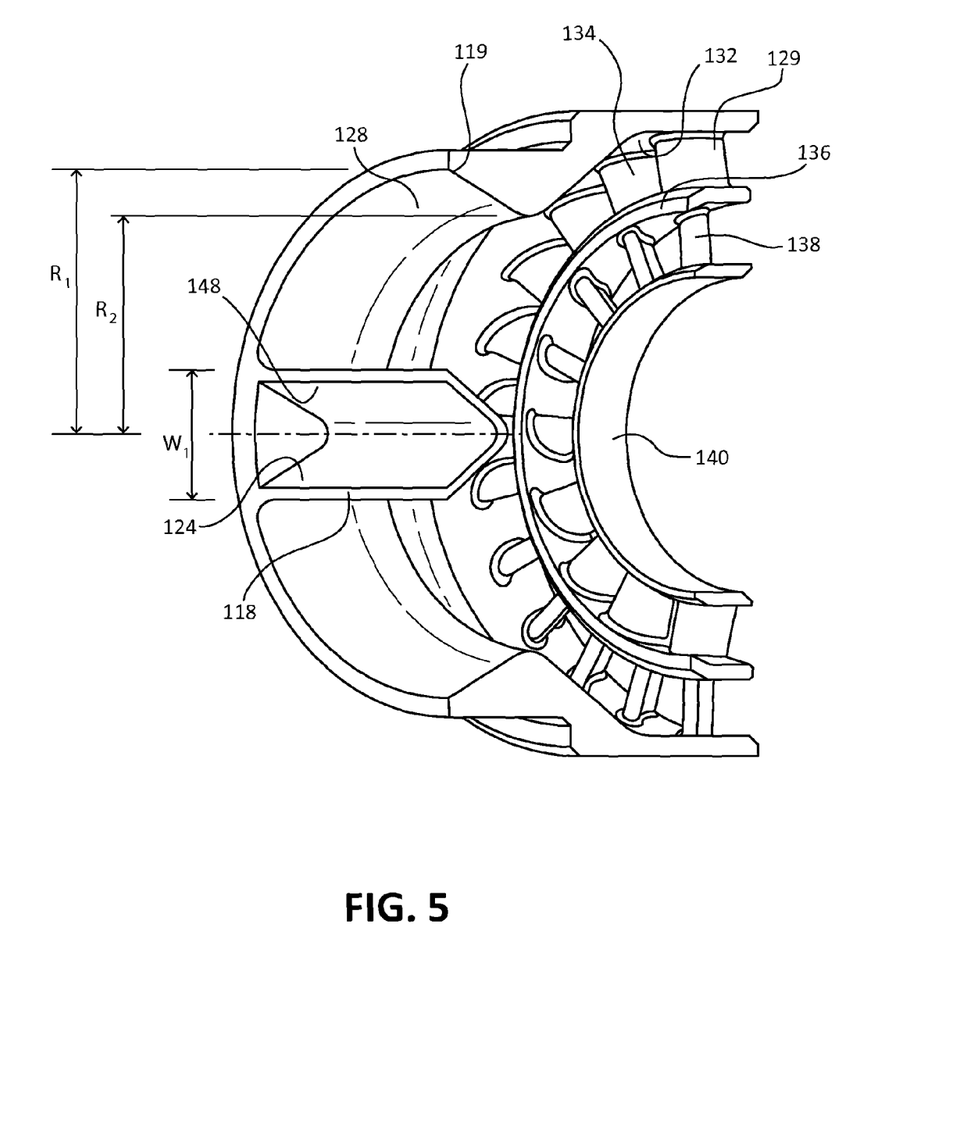
FIG. 5 illustrates a view of a bluff body mixer with a v-gutter, in accordance with various embodiments.
Figure 6:
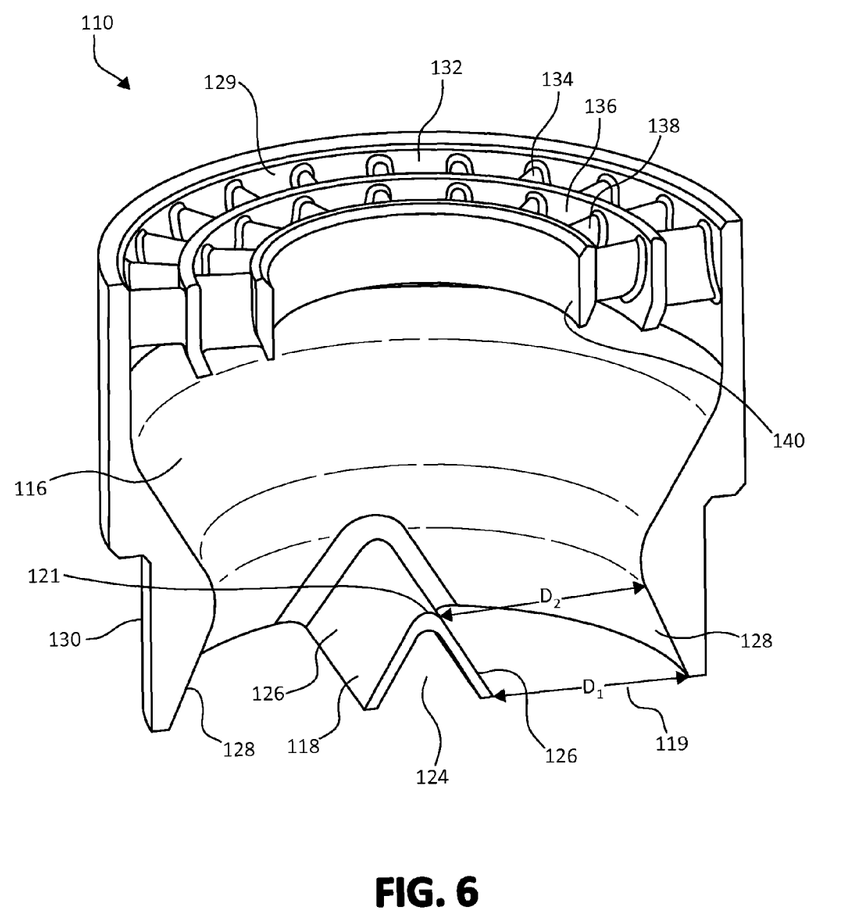
FIG. 6 illustrates a cross sectional view of a bluff body mixer as viewed from the exit port, in accordance with various embodiments.

With reference to FIGS. 4-6, mixer 110 is illustrated in accordance with various embodiments. Mixer 110 includes bluff body 118 extending between two points on inner surface 128 of mixer 110. Inner surface 128 of mixer 110 may have a circular contour. Exit port 119 may be the portion of mixer 110 containing bluff body 118. Bluff body 118 may have a v-shaped profile to form a v-shaped gutter. Bluff body 118 may bisect exit port 119 of mixer 110. Although bluff body 118 is depicted as a linear bluff body with gutter 124 having a v-shaped geometry defined by wall 148, other geometries may also be used. For example, bluff body 118 may comprise a circular, multi-radial, squared, or irregularly shaped gutter 124. Bluff body 118 may also have a rounded, linear, crossing, or other shape walls defining surface 126 and extending from inner surface 128 of mixer 110. The ratio of the width W1 of bluff body 118 to the exit radius R1 of exit port 119 (i.e., W1/R1) may be in the range from 0.2 to 0.45. The ratio of exit radius R1 to inlet radius R2 (i.e., R2/R1) may range from 1.1 to 1.6. The dimensions of W1, R1, and R2 may be selected to produce flow area that is constant or contracts by up to 15%. In various embodiments, the ratio of the bluff body area $A_b$ to the total exit area $A_e$ may range from 0.1 to 0.45 (i.e., $0.1 \leq A_b/A_e \leq 0.45$), where total exit area $A_e$ is equal to the area of the bluff body plus the flow area at the exit (i.e., $\pi R1^2$).

With reference to FIGS. 5 and 6, a counter swirler 129 (also referred to herein as a turbulator) is illustrated inserted into mixer 110 to turbulate air entering into mixer 110. In that regard, counter swirler 129 may include an outer annulus 132, a set of outer airfoils 134 pointed in a first direction, an intermediate annulus 136, and an inner set of airfoils 138 pointed a different direction than the outer set of outer airfoils 134, and an inner annulus 140. Counter swirler 129 may provide turbulent air that is mixed with fuel in mixer 110. The fuel/air mixture that is mixed in mixer 110 is then ejected from exit port 119. The fuel/air mixture passes over bluff body 118 and is delivered into combustion chamber 104 to provide a consistent burn in combustor 56.

With reference to FIG. 6, mixer 110 is illustrated with bluff body 118 having a contour that matches the contour of inner surface 128 of mixer 110, in accordance with various embodiments. The cross sectional view of mixer 110 includes a distance D1 between surface 126 and inner surface 128 at exit port 119. Mixer 110 also includes a distance D2 between surface 126 and inner surface 128 at apex 121 of bluff body 118 with distance D1 and distance D2 being selected to produce a constant area or contracting by up to 15%. In that regard, the radial cross-sectional area of exit port 119 is substantially the same as the radial cross-sectional area of cavity 116 taken at apex 121 of bluff body 118. The flared wall defined by inner surface 128 may offset the blockage of flow created by bluff body 118, as the contour of inner surface 128 may mirror the contour of surface 126 of bluff body 118. Surface 126 may extend from apex 121 at various angles relative to opposite surface 126. For example, the angle between surfaces 126 at apex 121 may be 60 degrees so that bluff body 118 has an equilateral triangular profile. As the angle between surfaces 126 increases or decreases the angle of inner surface 128 may also increase or decrease, respectively.

Figure 7:
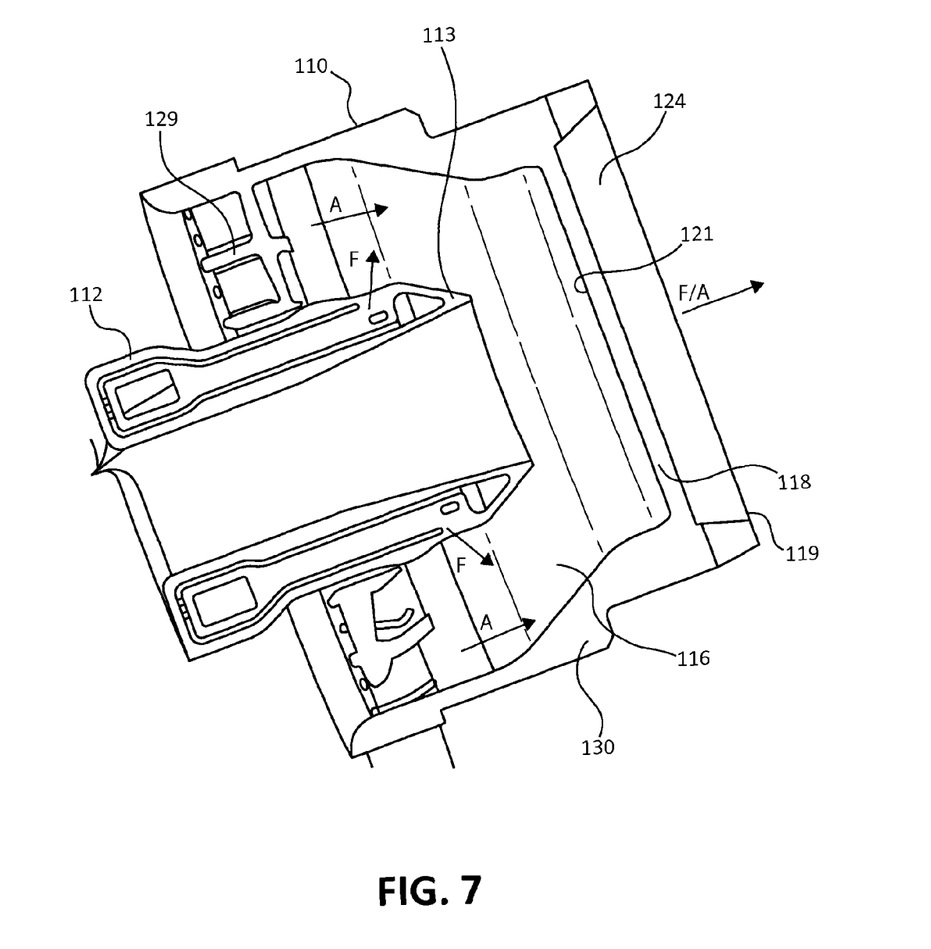
FIG. 7 illustrates a cross sectional view of a bluff body mixer with a fuel injector inserted into bluff body mixer, in accordance with various embodiments.

With reference to FIG. 7, and in accordance with various embodiments, mixer 110 is shown with fuel injector 113 of radial fuel injection system 112 inserted into cavity 116 defined by mixer 110. Fuel injector 113 delivers fuel stream F into cavity 116 of mixer 110. Turbulent air A flows into cavity 116 of mixer 110 after flowing over counter swirler 129. The fuel and air mix in cavity 116 to form a fuel/air mixture F/A ejected from exit port 119. Fuel/air mixture F/A is then combusted in combustion chamber 104 of combustor 56. Bluff body 118 creates a flow having a more consistent flow pattern for the fuel/air mixture than if the bluff body were absent. The stable flow may reduce NOx emissions by allowing for a more complete burn fuel.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor, comprising:
a combustion chamber;
an axial fuel injection system forward of the combustion chamber; and
a radial fuel injection system aft of the axial fuel injection system and configured to deliver fuel into the combustion chamber in a radial direction, the radial fuel injection system comprising:
a mixer having a bluff body at an exit port of the mixer, the bluff body having two surfaces extending between two points on an inner surface of the mixer, wherein the exit port of the mixer is proximal to the combustion chamber, wherein the mixer comprises a flared wall defined by the inner surface, and wherein a first angle formed by the flared wall and a horizontal plane is equal to a second angle formed by a third surface of the bluff body and the horizontal plane; and
a fuel injector disposed within the mixer.

2. The combustor of claim 1, further comprising a counter swirler disposed around the fuel injector, the counter swirler comprising:
a first set of airfoils oriented in a first circumferential direction; and
a second set of airfoils oriented in a second circumferential direction different from the first circumferential direction.

3. The combustor of claim 1, wherein the bluff body comprises a v-shaped gutter with an apex of the v-shaped gutter oriented away from the combustion chamber.

4. The combustor of claim 1, wherein the mixer comprises a cylindrical outer housing.

5. The combustor of claim 1, further comprising a liner, wherein the radial fuel injection system extends at least partially though the liner.

6. The combustor of claim 5, further comprising:
a mounting structure coupled to the liner; and
an outer housing of the mixer disposed at least partially within the mounting structure.

7. The combustor of claim 6, wherein the mixer comprises tabs retained in a slot defined by the mounting structure.

8. The combustor of claim 1, wherein the bluff body comprises at least one of a circular, multi-radial, squared, or irregularly shaped gutter.

9. A combustor, comprising:
a combustion chamber;
an axial fuel injection system forward of the combustion chamber; and
a radial fuel injection system aft of the axial fuel injection system and configured to deliver fuel into the combustion chamber in a radial direction, the radial fuel injection system comprising:
a mixer having a bluff body at an exit port of the mixer, the bluff body having two sides extending between two points on an inner surface of the mixer, wherein the exit port of the mixer is proximal to the combustion chamber, wherein the mixer comprises a flared wall defined by the inner surface, wherein a third side and a fourth side of the bluff body define a v-shaped gutter with an apex of the v-shaped gutter oriented away from the combustion chamber, and wherein a first distance in a direction parallel to a horizontal plane extending from the inner surface of the mixer to the apex of the bluff body is equal to a second distance in the direction parallel to the horizontal plane extending from the inner surface of the mixer to the third side of the bluff body at the exit port of the mixer, and
a fuel injector disposed within the mixer.

10. The combustor of claim 9, wherein the mixer comprises a cylindrical outer housing.

11. The combustor of claim 10, further comprising a liner, wherein the radial fuel injection system extends at least partially through the liner.

12. The combustor of claim 11 further comprising:
a mounting structure coupled to the liner; and
an outer housing of the mixer disposed at least partially within the mounting structure.

13. The combustor of claim 12, wherein the mixer comprises tabs retained in a slot defined by the mounting structure.

14. The combustor of claim 9, wherein the mixer comprises an exit radius (R1) at the exit port of the mixer and an inlet radius (R2) at the apex of the bluff body, and wherein the exit radius (R1) is greater than the inlet radius (R2).

15. The combustor of claim 14, wherein a ratio of the exit radius (R1) to the inlet radius (R2) is between 1.1 to 1 and 1.6 to 1.

16. The combustor of claim 9, wherein a first angle formed by the flared wall and a horizontal plane is equal to a second angle formed by the third side of the bluff body and the horizontal plane.

* * * * *